United States Patent
Staats et al.

(10) Patent No.: US 11,574,261 B2
(45) Date of Patent: Feb. 7, 2023

(54) SYSTEM AND METHOD FOR PREPARING A VEHICLE FOR A TRIP

(71) Applicant: Westinghouse Air Brake Technologies Corporation, Wilmerding, PA (US)

(72) Inventors: Andrew Staats, Cedar Rapids, IA (US); Stuart Barr, Cedar Rapids, IA (US); Keith Smith, Cedar Rapids, IA (US)

(73) Assignee: WESTINGHOUSE AIR BRAKE TECHNOLOGIES CORPORATION, Wilmerding, PA (US)

( * ) Notice: Subject to any disclaimer, the term of this patent is extended or adjusted under 35 U.S.C. 154(b) by 551 days.

(21) Appl. No.: 16/724,449

(22) Filed: Dec. 23, 2019

(65) Prior Publication Data

US 2021/0192406 A1    Jun. 24, 2021

(51) Int. Cl.

| | |
|---|---|
| *G06Q 10/06* | (2012.01) |
| *G06F 8/65* | (2018.01) |
| *B61L 25/02* | (2006.01) |
| *B61L 3/00* | (2006.01) |
| *B61L 27/40* | (2022.01) |

(52) U.S. Cl.
CPC ........ *G06Q 10/06311* (2013.01); *B61L 3/006* (2013.01); *B61L 25/02* (2013.01); *B61L 27/40* (2022.01); *G06F 8/65* (2013.01)

(58) Field of Classification Search
CPC ... G06Q 10/06311; B61L 27/40; B61L 3/006; B61L 25/02; G06F 8/65
See application file for complete search history.

(56) References Cited

U.S. PATENT DOCUMENTS

| | | | | |
|---|---|---|---|---|
| 5,168,451 A | * | 12/1992 | Bolger | G08G 1/202 340/994 |
| 2008/0288318 A1 | * | 11/2008 | Webb | G06Q 10/06315 705/7.22 |
| 2019/0324600 A1 | * | 10/2019 | Wipperfürth | G06F 3/0484 |

* cited by examiner

*Primary Examiner* — Gertrude Arthur Jeanglaude
(74) *Attorney, Agent, or Firm* — The Small Patent Law Group LLC; Josef L. Hoffmann

(57) ABSTRACT

A system and method for automatically communicating an identification signal from a vehicle controller of a vehicle that may include receiving trip data from a dispatch controller based on the identification signal that is communicated. Software of the vehicle controller may be updated at a determined time based on the trip data that is received, and movement of the vehicle may be controlled based on movement allowance signals received by the vehicle controller and used by the software of the vehicle controller during the movement of the vehicle to determine whether the vehicle is permitted to enter into segments of one or more routes.

20 Claims, 4 Drawing Sheets

SYSTEM AND METHOD FOR PREPARING A VEHICLE FOR A TRIP

BACKGROUND

Technical Field

The subject matter described herein relates to preparing a vehicle for an upcoming trip.

Discussion of Art

Many vehicles use software or computer-based programs to assist in completing a trip. As an example, many vehicles use navigation devices to provide directions to determined locations. By inputting a destination, the navigation system may determine the fastest route to the destination. In determining the fastest route, the navigation system may receive inputs from an off-board device related to traffic patterns, road construction, road closures, or the like to map out the fastest route. Then, as the vehicle travels, the navigation system continues to receive information and data that may be used to update the fastest route.

Similarly, in another example, energy management systems and positive train control (PTC) systems may be used for rail vehicles to form trip plans, or provide information related to other vehicles on a route. By using trip plans, a trip objective such as reducing emissions, increasing fuel efficiency, decreasing travel time, etc. may be accomplished. Similarly, by using PTC systems, trip safety may be improved, and accidents prevented.

With all of the different computer-based programs and information, often a vehicle operator must now perform a pre-trip routine to ensure the most up to date information, software, and the like have been received and implemented by the vehicle before the trip begins. Often an operator must login into the system at the beginning of a trip, at which point the vehicle may prompt notifications regarding information that needs to be obtained, or software that must be updated. Alternatively, no prompting is provided, and the vehicle operator must remember to check for information and system updates prior to starting the trip. Once this check is undertaken, if system updates are required, the vehicle operator must then wait for the updates to occur before the vehicle even begins a trip. The routine of having a vehicle operator remember to update information can result in human error when an operator forgets or neglects to update a system before a trip. Additionally, some system updates can take hours to update, unexpectedly delaying the start of a trip.

BRIEF DESCRIPTION

In accordance with one embodiment, a method may be provided for automatically communicating an identification signal from a vehicle controller of a vehicle. The method may include receiving trip data from a dispatch controller based on the identification signal that is communicated, and updating software of the vehicle controller at a determined time based on the trip data that is received. The method may also include controlling movement of the vehicle based on movement allowance signals received by the vehicle controller and used by the software of the vehicle controller during the movement of the vehicle to determine whether the vehicle is permitted to enter into segments of one or more routes.

In accordance with one embodiment, a system may be provided that may include a vehicle controller of a vehicle. The vehicle controller may be configured to automatically communicate an identification signal, and receive vehicle trip data from a vehicle dispatch controller based on the identification signal communicated. The vehicle controller may also be configured to update software of the vehicle controller at a determined time based on the vehicle trip data received, and control movement of the vehicle based on movement allowance signals received by the vehicle controller and used by the software of the vehicle controller during the movement of the vehicle to determine whether the vehicle is permitted to enter into segments of one or more routes based on the movement allowance signals.

In accordance with one embodiment, a system may be provided that may include a system controller configured to receive a first vehicle identification signal from a first vehicle controller of a first vehicle, request vehicle trip data from a dispatch controller based on the vehicle identification signal responsive to receiving the first vehicle identification signal, and send an update signal to the first vehicle controller to update software within the first vehicle controller at a determined time based on the vehicle trip data received.

BRIEF DESCRIPTION OF THE DRAWINGS

The inventive subject matter may be understood from reading the following description of non-limiting embodiments, with reference to the attached drawings, wherein below.

DETAILED DESCRIPTION

Embodiments of the subject matter described herein relate to a system and method for preparing a vehicle system for a trip prior to a vehicle operator logging into the system. Prior to login, a vehicle controller automatically communicates an identification signal to a system controller that includes databases and information related to the vehicle. In addition, the system controller may be in communication with a dispatch controller to receive additional information related to the vehicle. The vehicle based information that may be within the system controller, or received by the system controller, may include trip data such as movement allowance signals, or positive train control (PTC) information, trip plans, software updates, route maps, etc. The system controller then communicates the vehicle based information to the vehicle controller so that the vehicle controller may perform updates, have trip plans or routes ready to display, or the like, prior to the vehicle operator logging into the system. When the vehicle operator provides login information, the vehicle controller is ready for use, so that movement of the vehicle may be based on the movement allowance signals received by the vehicle controller and used by the updated software during a trip. By communicating information and updating systems prior to login, human error is eliminated, and trip time is saved.

Figure 1:
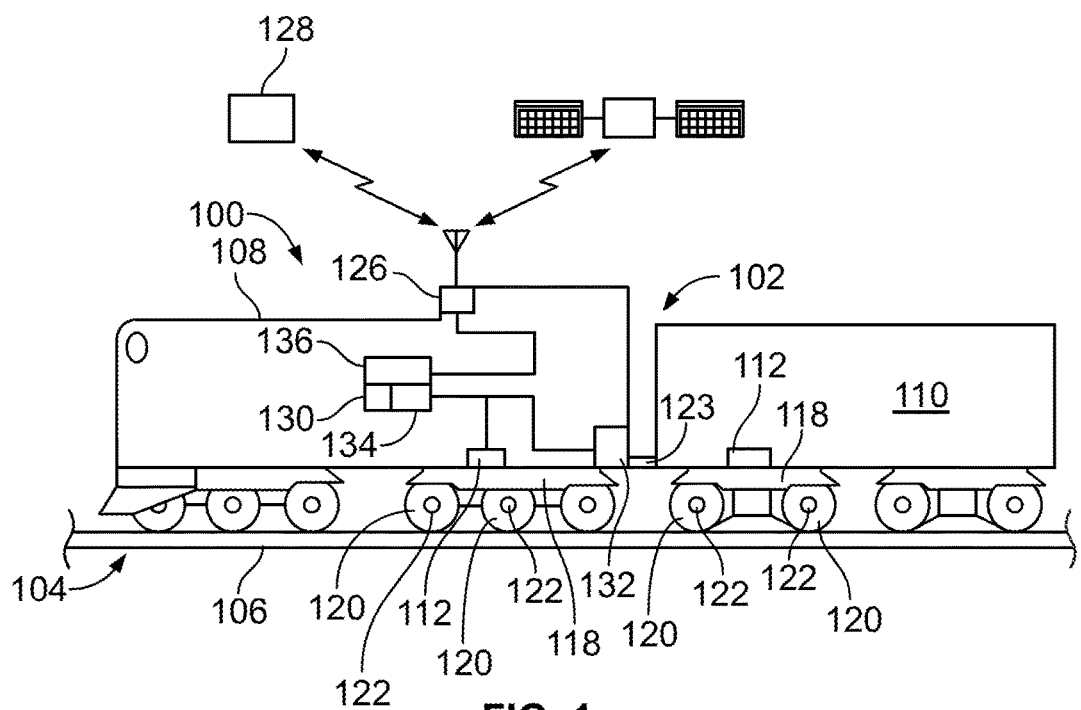
FIG. 1 is a schematic diagram of a vehicle system.

FIG. 1 illustrates a schematic diagram of a control system 100 according to an embodiment. The control system may be disposed on a vehicle system 102. The vehicle system may be configured to travel along a route 104 on a trip from a starting or departure location to a destination or arrival location. The vehicle system includes a propulsion-generating vehicle 108 and a non-propulsion-generating vehicle 110 that are mechanically interconnected to one another to travel together along the route. The vehicle system may include at least one propulsion-generating vehicle and optionally, one or more non-propulsion-generating vehicles. In one example, the single vehicle may be a truck or an off-road vehicle.

The propulsion-generating vehicle may be configured to generate tractive efforts to propel (for example, pull or push) the non-propulsion-generating vehicle along the route. The propulsion-generating vehicle includes a propulsion subsystem, including one or more traction motors, that generates tractive effort to propel the vehicle system. The propulsion-generating vehicle also includes a braking system 112 that generates braking effort for the vehicle system to slow down or stop itself from moving. Optionally, the non-propulsion-generating vehicle includes a braking system but not a propulsion subsystem. The propulsion-generating vehicle may be referred to herein as a propulsion vehicle, and the non-propulsion-generating vehicle may be referred to herein as a car. Although one propulsion vehicle and one car are shown in FIG. 1, the vehicle system may include multiple propulsion vehicles and/or multiple cars. In an alternative embodiment, the vehicle system only includes the propulsion vehicle such that the propulsion vehicle is not coupled to the car or another kind of vehicle.

The control system controls the movements of the vehicle system. In the illustrated embodiment, the control system may be disposed entirely on the propulsion vehicle. In other embodiments, however, one or more components of the control system may be distributed among several vehicles, such as the vehicles that make up the vehicle system. For example, some components may be distributed among two or more propulsion vehicles that are coupled together in a group or consist. In an alternative embodiment, at least some of the components of the control system may be located remotely from the vehicle system, such as at a dispatch location. The remote components of the control system may communicate with the vehicle system (and with components of the control system disposed thereon).

In the illustrated embodiment, the vehicle system may be a rail vehicle system, and the route may be a track formed by one or more rails. The propulsion vehicle may be a locomotive, and the car may be a rail car that carries passengers and/or cargo. Alternatively, the propulsion vehicle may be another type of rail vehicle other than a locomotive. In an alternative embodiment, the vehicle system may be one or more automobiles, marine vessels, aircraft, mining vehicles, agricultural vehicles, or other off-highway vehicles (OHV) system (e.g., a vehicle system that is not legally permitted and/or designed for travel on public roadways), or the like. While some examples provided herein describe the route as being a track, not all embodiments are limited to a rail vehicle traveling on a railroad track. One or more embodiments may be used in connection with non-rail vehicles and routes other than tracks, such as roads, paths, waterways, or the like.

In the example of FIG. 1, the vehicles of the vehicle system each include multiple wheels 120 that engage the route and at least one axle 122 that couples left and right wheels together (only the left wheels are shown in FIG. 1). Optionally, the wheels and axles are located on one or more trucks or bogies 118. Optionally, the trucks may be fixed-axle trucks, such that the wheels are rotationally fixed to the axles, so the left wheel rotates the same speed, amount, and at the same times as the right wheel. The vehicles in a vehicle system may be mechanically coupled with each other, such as by couplers. For example, the propulsion vehicle can be mechanically coupled to the car by a coupler 123.

The coupler may have a draft gear configured to absorb compression and tension forces to reduce slack between the vehicles. Although not shown in FIG. 1, the propulsion vehicle may have a coupler located at a rear end of the propulsion vehicle and/or the car may have a coupler located at a front end of the car for mechanically coupling the respective vehicles to additional vehicles in the vehicle system. Alternatively, the vehicles in a vehicle system may not be mechanically coupled with each other, but may be logically coupled with each other. For example, the vehicles may be logically coupled with each other by the vehicles communicating with each other to coordinate the movements of the vehicles with each other so that the vehicles travel together in a convoy or group as the vehicle system.

The control system may further include a wireless communication system 126 that allows wireless communications between vehicles in the vehicle system and/or with remote locations, such as the remote (dispatch) location 128. The communication system may include a receiver and a transmitter, or a transceiver that performs both receiving and transmitting functions. The communication system may also include an antenna and associated circuitry.

The control system further includes a trip characterization element 130. The trip characterization element may be configured to provide information about the trip of the vehicle system along the route. The trip information may include route characteristics, designated locations, designated stopping locations, schedule times, meet-up events, directions along the route, and the like.

For example, the designated route characteristics may include grade, elevation slow warnings, environmental conditions (e.g., rain and snow), and curvature information. The designated locations may include the locations of wayside devices, passing loops, re-fueling stations, passenger, crew, and/or cargo changing stations, and the starting and destination locations for the trip. At least some of the designated locations may be designated stopping locations where the vehicle system may be scheduled to come to a complete stop for a period of time. For example, a passenger changing station may be a designated stopping location, while a wayside device may be a designated location that is not a stopping location. The wayside device may be used to check on the on-time status of the vehicle system by comparing the actual time at which the vehicle system passes the designated wayside device along the route to a projected time for the vehicle system to pass the wayside device according to the trip plan.

The trip information concerning schedule times may include departure times and arrival times for the overall trip, times for reaching designated locations, and/or arrival times, break times (e.g., the time that the vehicle system may be stopped), and departure times at various designated stopping locations during the trip. The meet-up events include locations of passing loops and timing information for passing, or getting passed by, another vehicle system on the same route. The directions along the route are directions used to traverse the route to reach the destination or arrival location. The directions may be updated to provide a path around a congested area or a construction or maintenance area of the route.

The trip characterization element may be a database stored in an electronic storage device, or memory. The information in the trip characterization element 130 may be input via the user interface device by an operator, may be automatically uploaded, or may be received remotely via the communication system. The source for at least some of the information in the trip characterization element may be a trip manifest, a log, or the like.

In an embodiment, the control system may include a vehicle characterization element 134. The vehicle characterization element may provide information about the make-up of the vehicle system, such as the type of cars (for example, the manufacturer, the product number, the materials, etc.), the number of cars, the weight of cars, whether the cars are consistent (meaning relatively identical in weight and distribution throughout the length of the vehicle system) or inconsistent, the type and weight of cargo, the total weight of the vehicle system, the number of propulsion vehicles, the position and arrangement of propulsion vehicles relative to the cars, the type of propulsion vehicles (including the manufacturer, the product number, power output capabilities, available notch settings, fuel usage rates, etc.), and the like.

The vehicle characterization element may be a database stored in an electronic storage device, or memory. The information in the vehicle characterization element may be input using an input/output (I/O) device (referred to as a user interface device) by an operator, may be automatically uploaded, or may be received remotely via the communication system. The source for at least some of the information in the vehicle characterization element may be a vehicle manifest, a log, or the like.

The control system has a controller 136 or control unit that may be a hardware and/or software system which operates to perform one or more functions for the vehicle system. The controller receives information from components of the control system, analyzes the received information, and generates operational settings for the vehicle system to control the movements of the vehicle system. The operational settings may be contained in a trip plan. The controller may have access to, or receives information from, a locator device 124 (FIG. 2), a vehicle characterization element, trip characterization element, and at least some of the other sensors 132 on the vehicle system.

Figure 2:
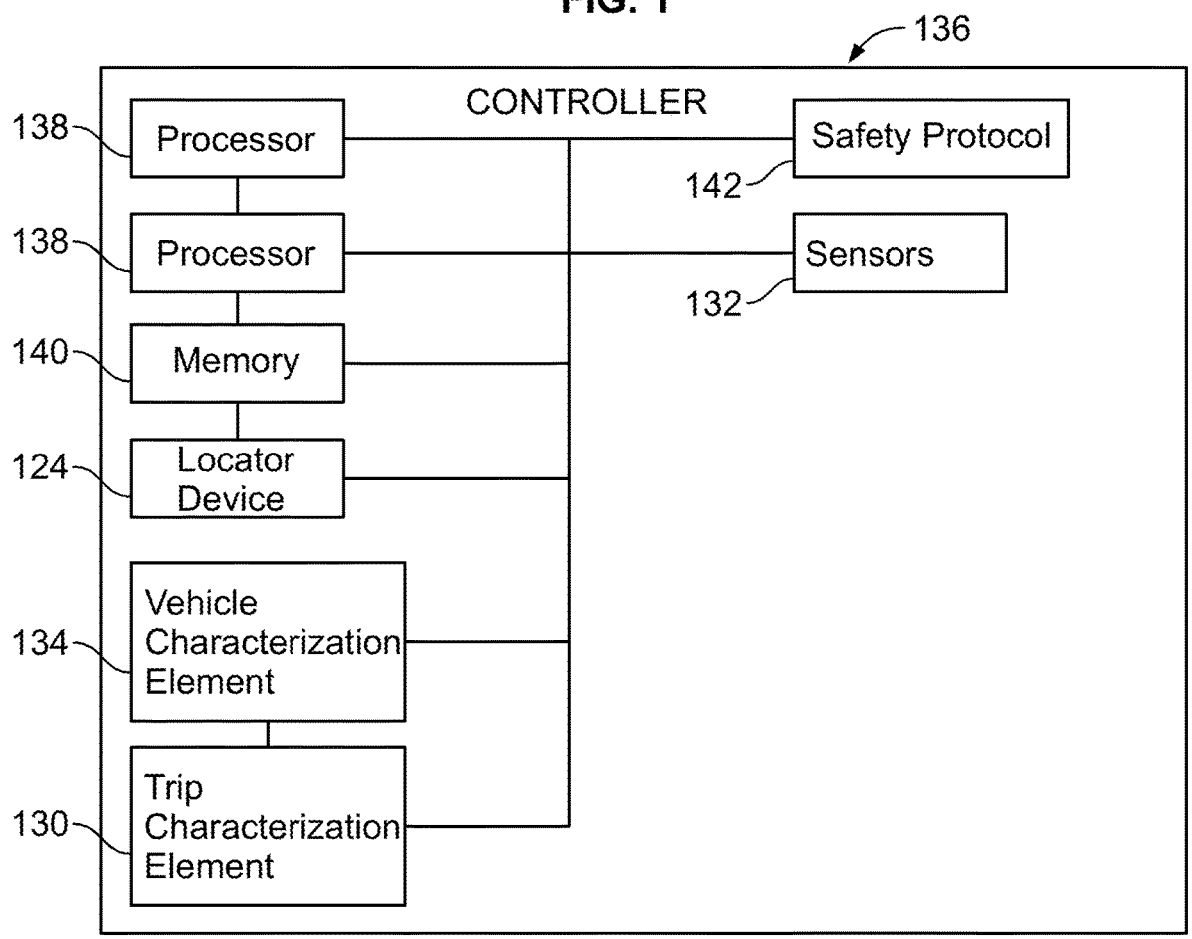
FIG. 2 is a schematic diagram of a vehicle control system.

FIG. 2 provides a schematic illustration of a controller that may be configured to control operation of a propulsion vehicle. The controller may be a device that includes one or more processors 138 therein (e.g., within a housing). Each processor may include a microprocessor or equivalent control circuitry. At least one algorithm operates within the one or more processors. For example, the one or more processors may operate according to one or more algorithms to generate the trip plan.

The controller optionally may also include a controller memory 140, which may be an electronic, computer-readable storage device or medium. The controller memory may be within the housing of the controller, or alternatively may be on a separate device that may be communicatively coupled to the controller and the one or more processors therein. By "communicatively coupled," it is meant that two devices, systems, subsystems, assemblies, modules, components, and the like, are joined by one or more wired and/or wireless communication links, such as by one or more conductive (e.g., copper) wires, cables, or buses; wireless networks; fiber optic cables, and the like. The controller memory can include a tangible, non-transitory computer-readable storage medium that stores data on a temporary or permanent basis for use by the one or more processors. The memory may include one or more volatile and/or non-volatile memory devices, such as random access memory (RAM), static random access memory (SRAM), dynamic RAM (DRAM), another type of RAM, read only memory (ROM), flash memory, magnetic storage devices (e.g., hard discs, floppy discs, or magnetic tapes), optical discs, and the like.

By using, collecting, and processing information and data from the one or more processors and memory, the controller may determine operational settings for one or more vehicles for the trip plan. The operational settings may be one or more of speeds, throttle settings, brake settings, charge rate settings, discharge rate settings, or accelerations for the vehicle system to implement during the trip. Optionally, the controller may be configured to communicate at least some of the operational settings designated by the controller in a control signal. The control signal may be directed to the propulsion subsystem, the braking subsystem, or a user interface device of the vehicle system. For example, the control signal may be directed to the propulsion subsystem and may include notch throttle settings of a traction motor for the propulsion subsystem to implement autonomously upon receipt of the control signal.

In another example, the control signal may be directed to a user interface device that displays and/or otherwise presents information to a human operator of the vehicle system. The control signal to the user interface device may include throttle settings for a throttle that controls the propulsion subsystem. The control signal may also include data for displaying the throttle settings visually on a display of the user interface device and/or for alerting the operator audibly using a speaker of the user interface device. The throttle settings optionally may be presented as a suggestion to the operator, for the operator to decide whether or not to implement the suggested throttle settings.

In an embodiment, the vehicle controller may include one or more processors that implement a safety protocol 142. In particular, vehicles may communicate with an off-board, or remote protection system that may restrict movement of one or more vehicles by communicating movement allowance signals to vehicles. The movement allowance signals may be positive control signals or negative control signals. Specifically, positive control signals indicate which route segments or sections that the vehicle may travel over. In particular, for a positive control signal, the vehicle may not travel the route segment or section until receiving a signal to do so. Alternatively, a negative control signal may be provided where the vehicle may travel a route segment or section until the negative control signal is received, stopping the movement of the vehicle.

In one example, the safety protocol is a PTC protocol that provides a positive control signal that allows a vehicle to travel upon a route segment or section upon receiving the positive control signal. As used herein, PTC, or PTC protocol, may be considered a control protocol used to provide enhanced safety for rail vehicles during a trip. Specifically, to combat safety issues in rail vehicles, PTC may be used by a vehicle controller to prevent potentially unsafe movement of rail vehicles. Controllers that use PTC may communicate, including wirelessly, with other rail vehicles, off-board devices, command center devices, dispatch devices, etc. to receive information related to other vehicles and safety related to different routes. The PTC protocol may be implemented in software and/or hardware and communicate vehicle parameters with other vehicles, control centers, or the like to prevent the collision of two vehicles. Vehicle parameters include global positioning system GPS information including location, distance and speed; tachometer readings, information stored in a memory such as a trip plan, or the like. The PTC protocol operates the controller to utilize these parameters to determine potential overlaps or collisions of rail vehicle along a route during determined time periods. By using a PTC protocol, timing of communication may be controlled.

The vehicle control system further may include the trip characterization element that is described above that provides information and data for use by the PTC protocol. The trip characterization element may be configured to provide information about the trip of the vehicle system along the route. The trip information may include route characteristics, designated locations, designated stopping locations, schedule times, meet-up events, directions along the route and the like. For example, the designated route characteristics may include grade, elevation slow warnings, environmental conditions (e.g., rain and snow) and curvature information. The designated locations may include the locations of wayside devices, passing loops, re-fueling stations, passenger, crew and/or cargo changing stations and the starting and destination locations for the trip. At least some of the designated locations may be designated stopping locations where the vehicle system may be scheduled to come to a complete stop for a period of time. For example, a passenger changing station may be a designated stopping location, while a wayside device may be a designated location that is not a stopping location.

In an alternative embodiment, at least some of the components of the vehicle control system may be located off-board from the vehicle system, such as at the dispatch location. The remote or off-board components of the control system may communicate with the vehicle system (and with components of the control system disposed thereon).

Figure 3:
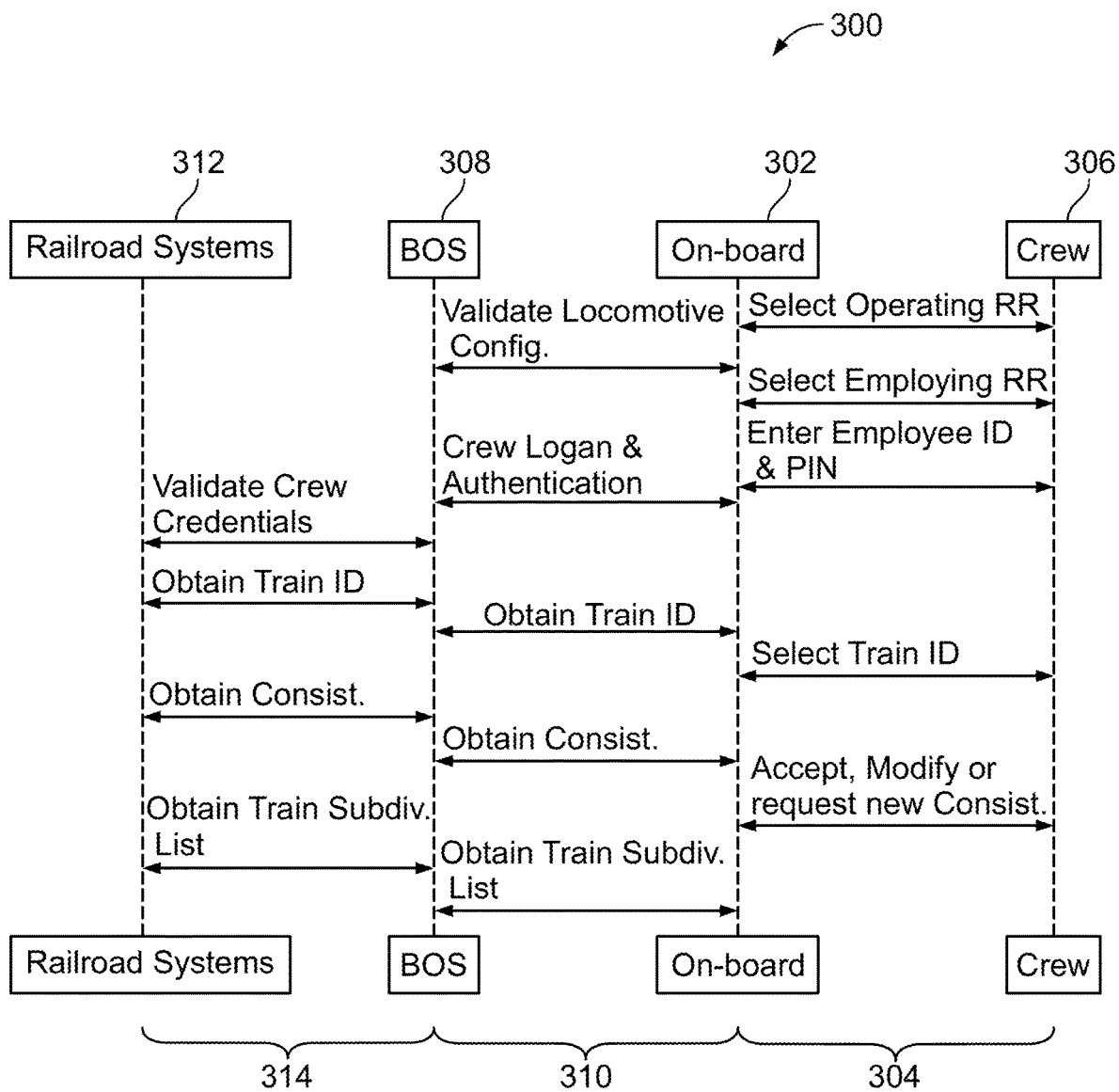
FIG. 3 a schematic of a communication system.

FIG. 3 illustrates an example communication system 300 for a vehicle system. In one example, the vehicle system is the vehicle system of FIG. 1. The communication system may include a vehicle controller 302 that may be on-board the vehicle system. In one example, the vehicle controller may be the controller of FIG. 1 or FIG. 2. The vehicle controller may have a first communication pathway 304 with a vehicle operator 306. The vehicle controller may include an output device for communicating information to the vehicle operator. The output device may be a display that may display or present information to the vehicle operator, a display that may present signals or patterns understood by the vehicle operator, speakers or other sound emitting device that may provide auditory communication to the vehicle operator, or the like.

The vehicle controller may also include an input device for the vehicle operator to input information into the vehicle controller. The input device may be a keyboard, touch screen, voice activated component such as a head-set, etc. The first communication pathway may be any communication from the vehicle operator to the vehicle controller including through the input device, and any communication from the vehicle controller to the vehicle operator including through the output device. The first communication pathway may be wire-based, wireless, over the air, over a cellular network, over a local area network (LAN) line, or the like.

The vehicle operator may provide an operator identification input to the vehicle controller. In one example, the operator identification input may be a username and password. Alternatively, the operator identification input may be a pin number, bar code, QR code, fingerprint, face, temporary identification number provided by a remote security device, etc. Based on the operator identification input, the vehicle controller may determine access of the vehicle operator to information and databases associated with the vehicle controller. For example, if an incorrect password, pin, etc. is entered into the vehicle input, the vehicle controller may prevent a vehicle operator from receiving any information from the vehicle controller. Similarly, if a determined number of incorrect entries are provided, the vehicle controller may communicate a warning signal to an off-board device in the communication system to alert a third party someone other than the vehicle operator is attempting to access the vehicle controller.

An auxiliary communication device 308 may be in communication with the vehicle controller. The auxiliary communication device may include a system controller that may receive, process, and communicate information between controllers. In one example, the auxiliary communication device may be considered a back office system that is dedicated to keeping the vehicle controller up to date, including having software updates, PTC information, etc. Alternatively, the auxiliary communication device may be a vehicle dispatch controller that communicates with plural vehicles within a vehicle system.

Specifically, the auxiliary communication device may include a database, and/or receive communication signals from another or remote communication device, including a vehicle dispatch controller, that relates to or may be associated with the vehicle system. The information, or trip data, that may be within the database or communication signals received from the remote communication device may include software updates, PTC information, trip plans, trip schedules, verification data related to the vehicle operator(s) including operator characteristics, vehicle characteristics, vehicle route characteristics, etc.

Software updates may include for any program utilized by the vehicle controller. In one example, the software update is an update of routes on a map to account for road construction. In another example, the software update may be related to a communication protocol that provides additional security, or faster communication. Software updates may also include updating information, including PTC based information. PTC information may include information provided related to a PTC protocol including include initial PTC based information and updated PTC information. The PTC information may be communicated through movement allowance signals. In particular, movement allowance signals including information and trip data related to whether a vehicle system may safely move along a section of a route based on other vehicles that may be on that section of the route during the trip. Thus, the movement allowance signals are provided to control the movement of the vehicle system to prevent vehicle collisions on the section of the route. The movement allowance signals may include information and trip data related to whether the vehicle is permitted to enter segments or sections of a route during a trip.

Trip plans may be a set of operating settings for meeting one or more objectives of a vehicle system during a trip. The operating settings may include speeds, throttle settings, brake setting, heading settings, etc. The one or more objectives may include travel time goals, fuel efficiency goals, emissions goals, a combination thereof, or the like. The trip plan may be implemented by a vehicle operator, or followed autonomously by a vehicle system. Verification data related to the vehicle operator, or operator characteristics may include login information, passwords, pin numbers, operator name, operator job title, and the like as described in detail above.

Vehicle characteristics may include parameters related to the vehicle. Vehicle characteristics may include vehicle weight, vehicle size, vehicle speed, prime mover type including an internal combustion engine, an energy storage device, a hydraulic pump/motor, etc., fuel efficiency, power limits, auxiliary subsystem functionality, exhaust subsystem parameters including thermal properties and filtering, thermal parameters of a prime mover, efficiency parameters of a prime mover, vehicle model number, vehicle identification number, vehicle owner, etc. Vehicle route parameters may include any parameters related to the route the vehicle may be on during a trip. Vehicle route characteristics may include route length, route speed restrictions, road conditions, track conditions, wayside device availability, catenary device availability, environmental conditions including uphill and downhill grades, route curvature, weather condition, etc., number of route stops, fuel availability, population density or traffic, or the like.

A second communication pathway 310 may be provided between the auxiliary communication device and the vehicle communication device. The second communication pathway may be wire-based, wireless, over the air, over a cellular network, over a local area network (LAN) line, or the like. The second communication pathway may be utilized to communicate any of the trip data described above between the auxiliary communication device and the vehicle communication device. The auxiliary communication device may communicate the information to the vehicle controller, or the vehicle controller may communicate the information to the auxiliary communication device along the second communication pathway.

In one example, the second communication pathway that is between the auxiliary communication device and the vehicle controller may communicate vehicle configuration information for validation. In one example the vehicle configuration may include software configuration, and validation may include ensuring the software is updated. In particular, in one example the vehicle controller may receive a vehicle schedule and based on the vehicle schedule, the vehicle controller may autonomously prompt the auxiliary communication device to provide the software update at a determined time before the vehicle system begins the trip. In one example, the vehicle controller determines that a trip is scheduled to begin in twelve hours. In response, the vehicle controller prompts the auxiliary communication device to provide software update information, including movement allowance signals at that time. The vehicle controller may then predict when a vehicle operator may login for the trip and determine a determined time to provide and complete the update before the predicted time. Consequently, software updates are provided before a vehicle operator arrives at the vehicle system for operating the vehicle.

Alternatively, the auxiliary communication device determines when a vehicle system is to leave for a trip. Again, in one example, the determination may be based on a received vehicle schedule. In response to determining when the vehicle system will leave for a trip, the auxiliary communication device may autonomously communicate trip data including software updates, movement allowance signals, etc. to the vehicle controller. The vehicle controller may then predict when the vehicle operator will login and will determine a determined time to update the software. The vehicle controller may then execute updating the system at the determined time. Again, as a result, the vehicle controller may be ready for the trip before a vehicle operator arrives to navigate the vehicle system on the trip.

In another example, the second communication pathway that is between the auxiliary communication device and the vehicle controller may communicate vehicle operator authentication information. The operator authentication information may include a vehicle operator login, password, pin, or any authentication information previously described above. Upon receiving the operator authentication information, the auxiliary communication device may authentic or validate the vehicle operator may receive trip data for the vehicle system. In one example, the auxiliary communication device may be a vehicle dispatch that includes a database having the authentication information and may provide the authentication. Alternatively, the auxiliary communication device may communicate with a remote off-board controller that has a database that may authentic the vehicle operator information. In one example, the remote off-board controller may be a vehicle dispatch that includes a database with the authentication information.

In yet another example, the second communication pathway that is between the auxiliary communication device and the vehicle controller may communicate vehicle information. The vehicle information may include a vehicle identification, a vehicle make-up or consistency, or a vehicle sub-division list. The vehicle make-up or consistency may be for a rail vehicle and may include the cars, locomotives, etc. that will make up the vehicle system. The vehicle sub-division may again be for a rail vehicle and may be a rail vehicle subdivision list.

A vehicle dispatch controller 312 may also be provided that may communicate with the auxiliary communication device along a third communication pathway 314. The third communication pathway may be wire-based, wireless, over the air, over a cellular network, over a local area network (LAN) line, or the like. The vehicle dispatch controller may include one or more processors, a memory or database, and may communication with plural vehicle systems. In particular, the vehicle dispatch controller may receive communications related to the plural vehicle systems from the plural vehicle systems or from auxiliary communication devices. Based on the communications, the vehicle dispatch controller may make determinations related to the plural vehicles, including determinations based on a PTC protocol. Additionally, the database of the vehicle dispatch controller may include authentication data, vehicle system operational parameters, vehicle system trip plans, etc. while the one or more processors may generate movement allowance signals that may be communicated along the third communication pathway to the auxiliary communication device. To this end, vehicle information including vehicle identification, vehicle make-up or consistency, vehicle sub-division, etc. as described above, may be communicated through the third communication pathway.

Figure 4:
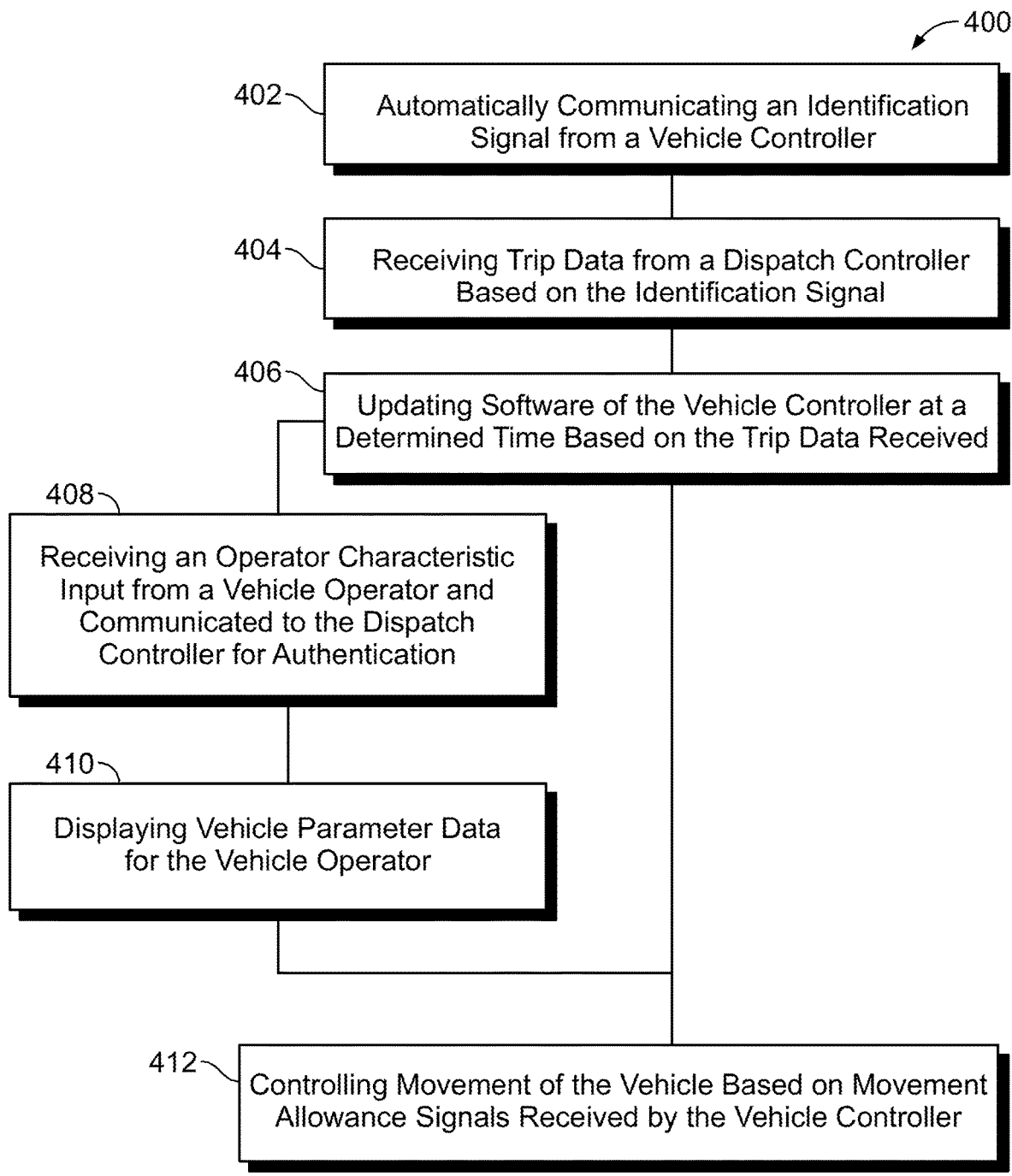
FIG. 4 is a block flow diagram of a method for preparing a vehicle for a trip.

FIG. 4 illustrates a method 400 of preparing a vehicle system for a trip. In one example, the method of FIG. 4 is performed by the communication system of FIG. 3.

At 402, an identification signal is automatically communicated from a vehicle controller. In one example, the identification signal may be communicated in response to a vehicle controller determining a trip schedule or starting time of a trip at a determined period before the start of the trip. In another example, an auxiliary communication device determines a schedule or starting time of the trip and prompts the vehicle controller to communicate the identification signal. In yet another example, a dispatch controller determines a trip schedule or starting time and prompts the vehicle controller to communicate the identification signal.

The identification signal may include information related to the vehicle, including vehicle configuration information such as software configuration. The identification signal identifies any trip data, software, trip plan, or the like related to the vehicle that may need to be updated. In this manner, an auxiliary communication device or a dispatch controller may search for updates for the identified trip data such as software, trip plan, etc. and determine a time to provide to the vehicle controller. To this end, the identification signal may be validated by an auxiliary communication device or dispatch controller such that trip data, including by providing trip data updates, software updates, trip plan updates, etc. that may be communicated to the vehicle controller in response to receiving the identification signal.

At 404, trip data from a dispatch controller may be received based on the identification signal that is communicated. In one example, an auxiliary communication device is the dispatch controller and is in communication with the vehicle controller. In another example, the dispatch controller may be in communication with an auxiliary communication device that is in communication with the vehicle controller. The trip data may be any trip data described in detail above in relation to FIG. 3. The trip data may thus include software updates, trip plans, trip plan updates, vehicle operational parameters, route operational parameters, authentication information etc. Thus, once the dispatch controller validates the identification signal related to the vehicle system, information and data for a trip may be communicated to and received by the vehicle controller.

At 406, software of the vehicle controller may be updated at a determined time based on the trip data received. Updating software may include updating a program, updating information, including PTC based information or a trip plan information, an updating of information as discussed in detail above, or the like. Because the software of the vehicle is updated when a trip is determined to be scheduled by one of the devices within a communication system, the software of the vehicle system may be updated at a determined time before the vehicle operator(s) arrive to start the trip. In particular, updating the software of the vehicle controller may include predicting when a vehicle operator will input a vehicle characteristic input or an operator characteristic input into the vehicle controller, determining a determined time based on a determined period of time before the operator is predicted to input the vehicle characteristic input or the operator characteristic input into the vehicle controller, and automatically updating the software of the vehicle controller at the determined time. By updating the software before the vehicle operator(s) arrives, human error may be eliminated from an operator neglecting to remember to check for updates, or from forgetting to update the software. Additionally, significant time is saved because the operators do not need to wait for software updates before starting a trip.

Optionally, at 408, operator characteristic input may be received from a vehicle operator and communicated to the dispatch controller for authentication. When the operator(s) arrives at the vehicle system for a trip, the operator may enter an operator characteristic input as described above. Specifically, the operator characteristic input may include an identification number, password, authentication code, quick response code (QR code), or the like. The operator characteristic input may then be communicated to a dispatch controller to be authenticated. In one example, the operator characteristic input is communicated directly to the dispatch controller and in another example the operator characteristic input is first communicated to an auxiliary communication device before being communicated to the dispatch controller.

Optionally, at 410, vehicle parameter data may be displayed for the vehicle operator in response to the authentication of the operator characteristic input. In one example, the vehicle parameter data may be displayed on an output of the vehicle controller such as a display screen. The vehicle parameter data may include a trip plan, vehicle consistency, global positioning system GPS information including location, distance and speed; tachometer readings, fuel available, expected trip fuel consumption, or the like. In one example, the vehicle parameter data may be modified based on an operator selection after the vehicle parameter data is displayed. As an example, the vehicle parameter may indicate that the trip only includes one stop, and the vehicle operator may select that parameter to indicate the operator plans to make two stops during the trip. In this manner, the vehicle operator may make adjustment to trip plans, or information as desired during the trip. Alternatively, the vehicle operator may not be permitted to make adjustments to ensure trip requirements are met.

At 412, movement the vehicle is controlled based on movement allowance signals received by the vehicle controller and used by the software of the vehicle controller during the movement of the vehicle to determine whether the vehicle may be permitted to enter into segments of one or more routes. In one example, the operator controls the vehicle based on the vehicle parameter data provided by the allowance signals to control the vehicle during the trip. Alternatively, the vehicle controller may control the movement of the vehicle based on the movement allowance signals. By operating based on the allowance signals, potential accidents may be avoided.

Figure 5:
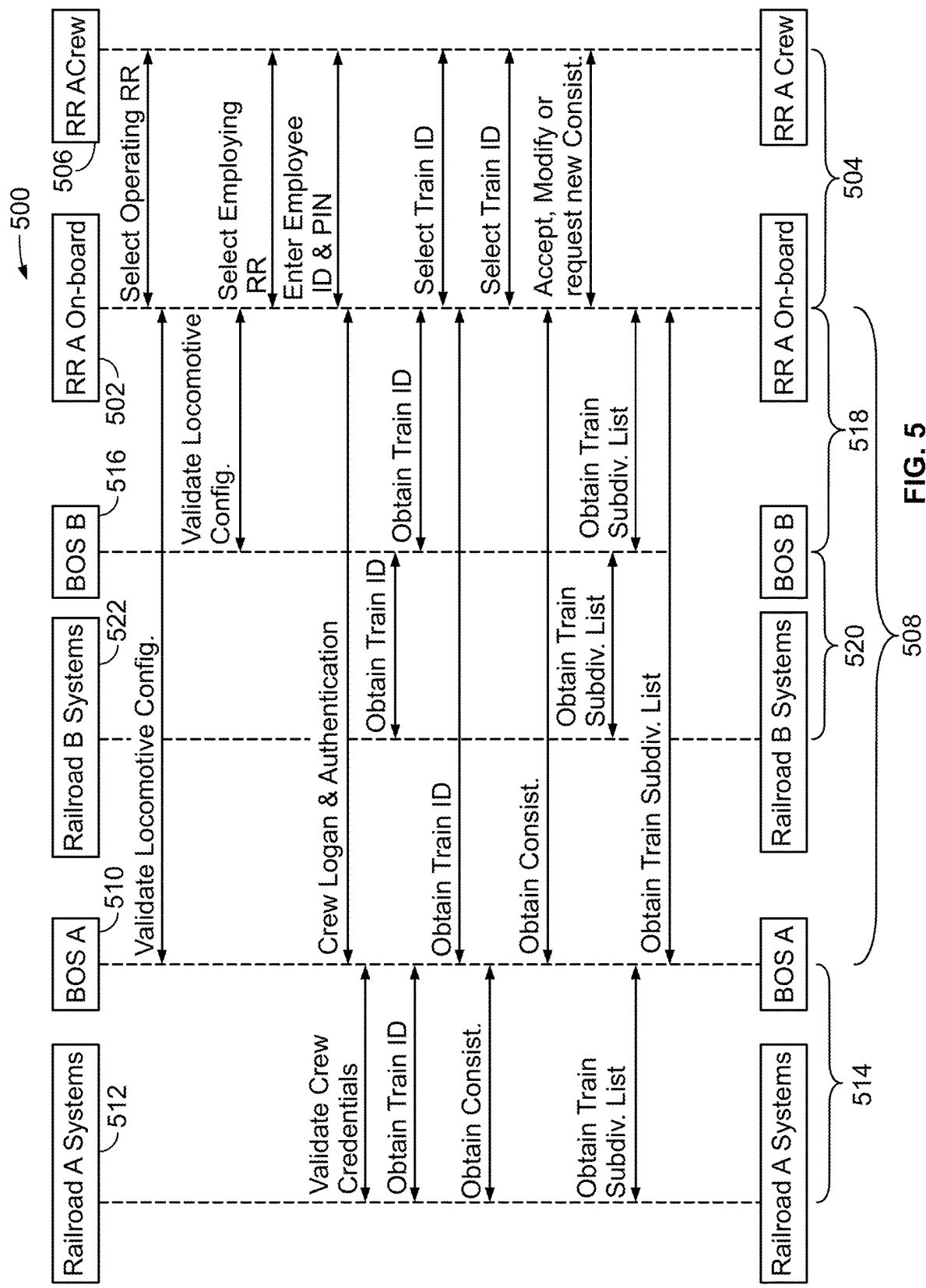
FIG. 5 is a schematic of a communication system.

FIG. 5 illustrates an example communication system 500 for a vehicle system. In one example, the vehicle system is the vehicle system of FIG. 1. The communication system of FIG. 5 includes a vehicle controller 502 that in one example may be the controller of FIGS. 1 and 2. The vehicle controller may have a first communication pathway 504 with a vehicle operator 506, and a second communication pathway 508 with an auxiliary communication device 510 similar to the communication system of FIG. 3. To this end, the data and information communicated between the vehicle controller along the first communication pathway with the vehicle operator, and the data and information communicated between the vehicle controller along the second communication pathway with the auxiliary communication device is identical to that described in relation to the vehicle controller, vehicle operator, auxiliary communication device, first communication pathway, and second communication pathway of FIG. 3. As such, the description of FIG. 3 is incorporated into the description of FIG. 5. Similarly, the communication system of FIG. 5 also has a dispatch controller 512 that may have a third communication pathway 514 with the auxiliary communication device. Again, the descriptions related to the dispatch controller and the third communication pathway are identical as described in relation to the dispatch controller and third communication pathway of FIG. 3, and that descriptions are incorporated into the description of FIG. 5.

The communication system 500 additionally illustrates a second auxiliary communication device 516 that may have a fourth communication pathway 518 with the vehicle controller, and a fifth communication pathway 520 with a second dispatch controller 522. Similar to the first, second, and third communication pathways, the fourth and fifth communication pathways may be wire-based, wireless, over the air, over a cellular network, over a local area network (LAN) line, or the like. In particular, the communication system 500 of FIG. 5 illustrates that for some trips, there may be plural vehicle dispatches and plural auxiliary communication devices. In one example, for a rail vehicle, the rail vehicle may travel hundreds of miles during a trip. As a result, communication with a more local dispatch controller facilitates communication. In addition, information about a vehicle system may be passed between different dispatch controller and auxiliary communication devices, including when provided through PTC protocols. Still, one dispatch controller may be more up to date with information than another, where communication sharing between dispatch controllers does not occur. Thus, by using multiple dispatch controllers to receive information, the most recent information may be received.

In the example of FIG. 5, the vehicle controller may communicate a message through either or both the second communication pathway to the first auxiliary communication device, and through the fourth communication pathway to the second auxiliary communication device. Then, both the first auxiliary communication device and the second auxiliary communication device may communication with a corresponding dispatch controller. Specifically, the first auxiliary communication device communicates with the first dispatch controller through the third communication pathway, and the second auxiliary communication device communicates with the second dispatch controller through the fifth communication pathway. In this manner, either the first dispatch controller, or second dispatch controller may provide trip data, updates, operator validation, etc. for the vehicle controller.

Thus, informational may communicated concurrently to the vehicle controller. In this manner, if the first dispatch controller does not have trip data, updates, validation information, or the like, and the second dispatch controller does, the vehicle controller still receives the appropriate validation, updates, trip data, etc. Additionally, the first dispatch controller may communicate movement allowance signals for the vehicle during the movement of the vehicle within a first designated geographic area and the second dispatch controller may communicate the movement allowance signals for the vehicle during the movement of the vehicle within a different, non-overlapping second designated geographic area. The vehicle controller may consequently receive additional trip data from the second dispatch controller responsive to the vehicle moving toward or entering into the second geographic area. As a result, software of the vehicle controller may be updated based on the additional trip data that is received from the second dispatch controller.

Thus provided are example communication systems that have a vehicle controller that communicates with auxiliary communication devices and/or dispatch controller to receive trip data. The trip data may include updates for software, that may be provided before a vehicle operator arrives at a vehicle system for a trip. Consequently, the vehicle operator does not have to remember to check for updates, and also does not have to wait for updates to begin a trip.

In one or more embodiment a method may be provided for automatically communicating an identification signal from a vehicle controller of a vehicle. The method may include receiving trip data from a dispatch controller based on the identification signal that is communicated, and updating software of the vehicle controller at a determined time based on the trip data that is received. The method may also include controlling movement of the vehicle based on movement allowance signals received by the vehicle controller and used by the software of the vehicle controller during the movement of the vehicle to determine whether the vehicle is permitted to enter into segments of one or more routes.

Optionally, updating the software of the vehicle controller may include predicting when a vehicle operator will input a vehicle characteristic input or an operator characteristic input into the vehicle controller, determining the determined time based on a determined period of time before the operator is predicted to input the vehicle characteristic input or the operator characteristic input into the vehicle controller, and automatically updating the software of the vehicle controller at the determined time.

Optionally, the method may also include receiving a validation signal responsive to communicating the identification signal, and generating the movement allowance signals responsive to receiving the validation signal from the dispatch controller.

Optionally, updating the software may include one of updating a computer program, updating a trip plan, updating a vehicle characteristic, or updating an operator characteristic.

Optionally, the method may also include receiving an operator characteristic input from a vehicle operator, communicating the operator characteristic input to the dispatch controller for authentication, and permitting operation of the vehicle in response to receiving an authentication signal from the dispatch controller based on the operator characteristic input. In one aspect, the operator characteristic input may be one of an identification number, password, authentication code, or quick response code. In another aspect, the method may also include displaying vehicle parameter data for the vehicle operator in response to the authentication of the operator characteristic input. In another example, the vehicle parameter data may include one of a trip plan or vehicle consistency. Alternatively, the method may include modifying the vehicle parameter data based on an operator selection after the vehicle parameter data is displayed.

Optionally, the method may also include determining the determined time for updating the software of the vehicle controller based on a vehicle trip plan included in the vehicle trip data.

Optionally the dispatch controller may be a first dispatch controller that communicates the movement allowance signals for the vehicle during the movement of the vehicle within a first designated geographic area and a second dispatch controller communicates the movement allowance signals for the vehicle during the movement of the vehicle within a different, non-overlapping second designated geographic area. The method may also include the vehicle controller receiving additional trip data from the second dispatch controller responsive to the vehicle moving toward or entering into the second geographic area, and updating the software of the vehicle controller based on the additional trip data that is received from the second dispatch controller.

In one or more examples, a system may be provided that may include a vehicle controller of a vehicle. The vehicle controller may be configured to automatically communicate an identification signal, and receive vehicle trip data from a vehicle dispatch controller based on the identification signal communicated. The vehicle controller may also be configured to update software of the vehicle controller at a determined time based on the vehicle trip data received, and control movement of the vehicle based on movement allowance signals received by the vehicle controller and used by the software of the vehicle controller during the movement of the vehicle to determine whether the vehicle is permitted to enter into segments of one or more routes based on the movement allowance signals.

Optionally, the vehicle controller may be configured to receive a vehicle characteristic input from a vehicle operator, and communicate the vehicle characteristic input to the vehicle dispatch controller for validation.

Optionally, the vehicle controller may be configured to receive an operator characteristic input from a vehicle operator, and communicate the operator characteristic input to the vehicle dispatch controller for authentication.

Optionally, the vehicle controller may be configured to determine the determined time for updating the software of the vehicle controller based on a vehicle trip plan included in the vehicle trip data; and update the software at the determined time.

In one or more embodiments, a system may be provided that may include a system controller configured to receive a first vehicle identification signal from a first vehicle controller of a first vehicle. request vehicle trip data from a dispatch controller based on the vehicle identification signal responsive to receiving the first vehicle identification signal, and send an update signal to the first vehicle controller to update software within the first vehicle controller at a determined time based on the vehicle trip data received.

Optionally, the system controller may be configured to determine from the first vehicle trip plan when the first vehicle is scheduled to start a trip, and determine the determined time based on when the first vehicle is scheduled to start the trip.

Optionally, the system controller may be configured to prompt the first vehicle controller to communicate the first vehicle identification signal.

Optionally, the system controller may also be configured to receive a second vehicle identification signal from a second vehicle controller of a second vehicle, and determine that the second vehicle identification signal is not from the first vehicle controller.

Optionally, the system controller may be configured to communicate vehicle operator characteristics to the dispatch controller to authenticate the vehicle operator characteristics.

As used herein, the terms "processor" and "computer," and related terms, e.g., "processing device," "computing device," and "controller" may be not limited to just those integrated circuits referred to in the art as a computer, but refer to a microcontroller, a microcomputer, a programmable logic controller (PLC), field programmable gate array, and application specific integrated circuit, and other programmable circuits. Suitable memory may include, for example, a computer-readable medium. A computer-readable medium may be, for example, a random-access memory (RAM), a computer-readable non-volatile medium, such as a flash memory. The term "non-transitory computer-readable media" represents a tangible computer-based device implemented for short-term and long-term storage of information, such as, computer-readable instructions, data structures, program modules and sub-modules, or other data in any device. Therefore, the methods described herein may be encoded as executable instructions embodied in a tangible, non-transitory, computer-readable medium, including, without limitation, a storage device and/or a memory device. Such instructions, when executed by a processor, cause the processor to perform at least a portion of the methods described herein. As such, the term includes tangible, computer-readable media, including, without limitation, non-transitory computer storage devices, including without limitation, volatile and non-volatile media, and removable and non-removable media such as firmware, physical and virtual storage, CD-ROMS, DVDs, and other digital sources, such as a network or the Internet.

The singular forms "a", "an", and "the" include plural references unless the context clearly dictates otherwise. "Optional" or "optionally" means that the subsequently described event or circumstance may or may not occur, and that the description may include instances where the event occurs and instances where it does not. Approximating language, as used herein throughout the specification and claims, may be applied to modify any quantitative representation that could permissibly vary without resulting in a change in the basic function to which it may be related. Accordingly, a value modified by a term or terms, such as "about," "substantially," and "approximately," may be not to be limited to the precise value specified. In at least some instances, the approximating language may correspond to the precision of an instrument for measuring the value. Here and throughout the specification and claims, range limitations may be combined and/or interchanged, such ranges may be identified and include all the sub-ranges contained therein unless context or language indicates otherwise.

This written description uses examples to disclose the embodiments, including the best mode, and to enable a person of ordinary skill in the art to practice the embodiments, including making and using any devices or systems and performing any incorporated methods. The claims define the patentable scope of the disclosure, and include other examples that occur to those of ordinary skill in the art. Such other examples are intended to be within the scope of the claims if they have structural elements that do not differ from the literal language of the claims, or if they include equivalent structural elements with insubstantial differences from the literal language of the claims.

What is claimed is:

1. A method comprising:
   automatically communicating an identification signal from a vehicle controller of a vehicle;
   receiving trip data from a dispatch controller based on the identification signal that is communicated;
   updating software of the vehicle controller at a determined time based on the trip data that is received;
   receiving movement allowance signals at the vehicle controller; and
   controlling movement of the vehicle based on the movement allowance signals received by the vehicle controller and used by the software of the vehicle controller updated at the determined time during the movement of the vehicle to determine whether the vehicle is permitted to enter into segments of one or more routes.

2. The method of claim 1, wherein updating the software of the vehicle controller includes predicting when a vehicle operator will input a vehicle characteristic input or an operator characteristic input into the vehicle controller, determining the determined time based on a determined period of time before the operator is predicted to input the vehicle characteristic input or the operator characteristic input into the vehicle controller, and automatically updating the software of the vehicle controller at the determined time.

3. The method of claim 1, further comprising receiving a validation signal responsive to communicating the identification signal; and generating the movement allowance signals responsive to receiving the validation signal from the dispatch controller.

4. The method of claim 1, wherein updating the software includes one of updating a computer program, updating a trip plan, updating a vehicle characteristic, or updating an operator characteristic.

5. The method of claim 1, further comprising receiving an operator characteristic input from a vehicle operator, communicating the operator characteristic input to the dispatch controller for authentication, and permitting operation of the vehicle in response to receiving an authentication signal from the dispatch controller based on the operator characteristic input.

6. The method of claim 5, wherein the operator characteristic input is one or more of an identification number, password, authentication code, or quick response code.

7. The method of claim 5, further comprising displaying vehicle parameter data for the vehicle operator in response to the authentication of the operator characteristic input.

8. The method of claim 7, wherein the vehicle parameter data includes one or more of a trip plan or vehicle consistency.

9. The method of claim 7, further comprising modifying the vehicle parameter data based on an operator selection after the vehicle parameter data is displayed.

10. The method of claim 1, comprising determining the determined time for updating the software of the vehicle controller based on a vehicle trip plan included in the vehicle trip data.

11. The method of claim 1, wherein the dispatch controller is a first dispatch controller that communicates the movement allowance signals for the vehicle during the movement of the vehicle within a first designated geographic area and a second dispatch controller communicates the movement allowance signals for the vehicle during the movement of the vehicle within a different, non-overlapping second designated geographic area, the method further comprising receiving additional trip data from the second dispatch controller using the vehicle controller and responsive to the vehicle moving toward or entering into the second geographic area; and updating the software of the vehicle controller based on the additional trip data that is received from the second dispatch controller.

12. A system comprising:
a vehicle controller of a vehicle, the vehicle controller configured to:
automatically communicate an identification signal;
receive vehicle trip data from a vehicle dispatch controller based on the identification signal communicated;
update software of the vehicle controller at a determined time based on the vehicle trip data received;
receive movement allowance signals from an off-board protection system; and
control movement of the vehicle based on movement allowance signals received by the vehicle controller and used by the software of the vehicle controller updated at the determined time during the movement of the vehicle to determine whether the vehicle is permitted to enter into segments of one or more routes based on the movement allowance signals.

13. The system of claim 12, wherein the vehicle controller is configured to receive a vehicle characteristic input from a vehicle operator, and communicate the vehicle characteristic input to the vehicle dispatch controller for validation.

14. The system of claim 12, wherein the vehicle controller is configured to receive an operator characteristic input from a vehicle operator, and communicate the operator characteristic input to the vehicle dispatch controller for authentication.

15. The system of claim 12, wherein the vehicle controller is configured to determine the determined time for updating the software of the vehicle controller based on a vehicle trip plan included in the vehicle trip data; and update the software at the determined time.

16. A system comprising:
a system controller configured to:
receive a first vehicle identification signal from a first vehicle controller of a first vehicle;
request vehicle trip data from a dispatch controller based on the first vehicle identification signal responsive to receiving the first vehicle identification signal; and
send an update signal to the first vehicle controller to update software within the first vehicle controller at a determined time based on the vehicle trip data received, the software updated configured to control movement of the vehicle.

17. The system of claim 16, wherein the system controller is configured to determine from the first vehicle trip plan when the first vehicle is scheduled to start a trip, and determine the determined time based on when the first vehicle is scheduled to start the trip.

18. The system of claim 16, the system controller is configured to prompt the first vehicle controller to communicate the first vehicle identification signal.

19. The system of claim 16, wherein the system controller is configured to:
receive a second vehicle identification signal from a second vehicle controller of a second vehicle; and
determine that the second vehicle identification signal is not from the first vehicle controller.

20. The system of claim 16, wherein the system controller is configured to communicate vehicle operator characteristics to the dispatch controller to authenticate the vehicle operator characteristics.

* * * * *